3,439,107
ELECTRICAL TRANSMISSION TOWER OF ARCH SHAPE
Arthur L. Scott, Columbia, S.C., assignor to C/P Corporation, Newberry S.C., a corporation of South Carolina
Filed Aug. 14, 1967, Ser. No. 660,456
Int. Cl. H02g 7/20; E04h 15/22
U.S. Cl. 174—45    9 Claims

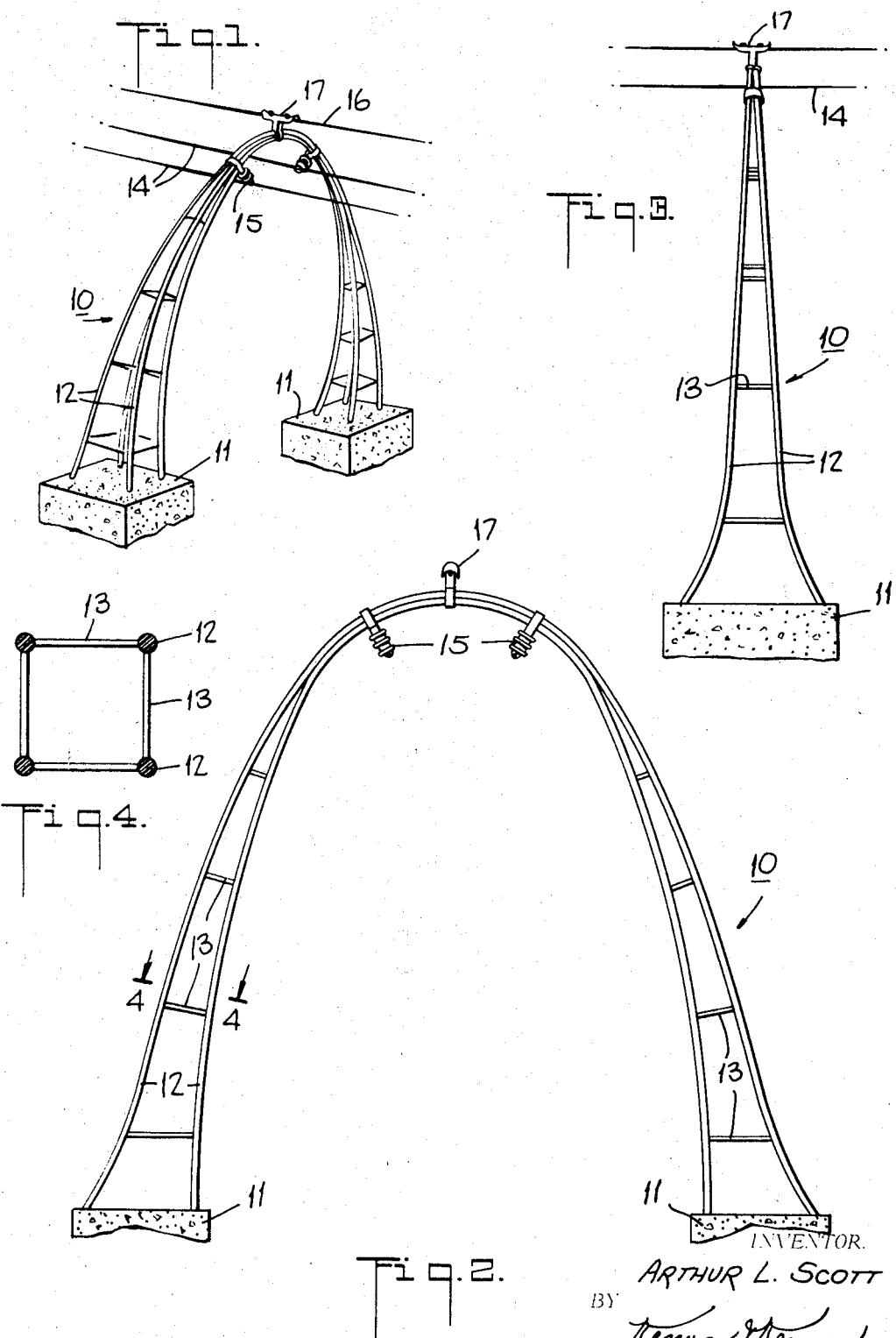
ELECTRICAL TRANSMISSION TOWER OF ARCH SHAPE
Filed Aug. 14, 1967
INVENTOR.
ARTHUR L. SCOTT
BY
ATTORNEY 400;300;3,439,107
Patented Apr. 15, 1969

ABSTRACT OF THE DISCLOSURE

The transmission tower is constructed as an arch. The support rods are spaced apart by spacer rods to converge from the bases to the apex of the arch so as to form a tapered width of arch. The rods are made of a resin impregnated glass fiber filament so as to be non-corrosive and dielectric and, where voltages permit, to eliminate the need for porcelain insulators for carrying the transmission wires.

---

This invention relates to an electrical transmission tower. More particularly, this invention relates to an arched electrical transmission tower and, still more particularly, to a fiber glass reinforced plastic electrical transmission tower of arched shape.

Heretofore, electrical transmission towers, especially those of substantial heights, have usually been constructed of metal members. However, while such towers have generally provided strength and rigidity for supporting transmission lines against various loads such as wind and ice, the towers have frequently been subject to corrosion and, in some instances, have been productive of undesirable electric phenomena. In addition, these towers have been constructed in a generally upstanding vertical manner such that the transmission lines have been supported to the outside of the towers. Thus, in the event of a transmission line becoming separated from its insulated support on one tower of a series of towers, the transmission line can either sag into contact with an uninsulated lower portion of the tower or can be allowed to swing through relatively wide distances from the tower. Also, since the towers have benerally been constructed as vertical supports, the costs of such towers have been relatively expensive due to the various design loads involved and the number and bulk of the structural members involved.

Furthermore, the heretofore used transmission towers have generally been provided with porcelain insulators in order to support the electrical transmission wires in an insulated manner.

Accordingly, it is an object of the invention to provide a transmission tower which has a relatively wide support base.

It is another object of the invention to contain a transmission line within the confines of a transmission tower.

It is another object of the invention to eliminate the need for insulators to carry the electrical transmission lines in transmission towers.

It is another object of the invention to construct a transmission tower of non-corrosive dielectric materials.

It is another object of the invention to reduce the costs of designing and constructing a transmission tower.

Briefly, the invention provides an electrical transmission tower which is constructed as an arch from a plurality of glass fiber reinforced plastic support rods. The rods of the tower are disposed to lie longitudinally of the arch so that each form a continuous support member. In addition, the rods are spaced from each other in a converging pattern from the base of the tower to the apex of the tower so as to define an arch which tapers in two perpendicular planes from the base to the apex. In this manner, the tower is of a gradually tapered shape when viewed from the side and of a generally tapered width when viewed from the front or rear. In order to hold the rods in spaced relation, a plurality of spacer rods of similar material as the rods are secured between each pair of adjacent rods.

In order to support transmission lines, the tower is, in one embodiment, provided with a plurality of insulated connectors. These connectors are secured to the support rods at convenient locations near the apex of the arch. However, where the voltages permit, the lines are supported directly from the tower without any need for separate insulated connectors.

Since the transmission tower is constructed as an arch, the tower is able to resist greater lateral forces than transmission towers constructed in a vertical mast-like manner. In addition, because of the arch shape, the tower can be constructed in a more simplified manner than heretofore towers, for example, structural steel towers, since the number of structural members and connections is substantially reduced. Further, since the tower is constructed of non-corrosive materials, precautions against rust and similar corrosion effects need not be taken.

These and other objects and advantages of the invention will become more apparent from the following detailed description and appended claims taken in conjunction with the accompanying drawings in which:

FIG. 1 illustrates a perspective view of an electrical transmission tower according to the invention;

FIG. 2 illustrates a front view of the tower of FIG. 1;

FIG. 3 illustrates a side view of the tower of FIG. 1; and

FIG. 4 illustrates a view taken on line 4—4 of FIG. 2.

Referring to the drawings, the electrical transmission tower 10 is formed in an arch shape and is supported at the bases on a pair of spaced foundations 11 of suitable material such as concrete. The tower 10 is composed of four continuous support rods 12 which extend longitudinally of the axis of the arch and which are held apart in spaced relation to each other by a plurality of spacer rods 13.

The support rods 12 of the tower 10 are held apart in a predetermined pattern by the spacer rods 13 so as to converge from each base adjacent a foundation 11 to the apex of the tower 10. In this manner, the support rods 12 define an arch which tapers in width from each base to the apex when viewed from the front as in FIG. 2. Also, the converging support rods 12 define an arch which tapers from the base to the apex when viewed from the side as in FIG. 3. In order to further insure the rigidity of the arched tower, the support rods 12 are contiguously secured to each other along the apex by any suitable securing means.

In order to support electrical transmission wires 14 on the tower 10, a number of insulated connectors 15 are suspended from the support rods 12 in spaced relation at the apex of the tower 10. These insulators are constructed in a conventional manner to carry the transmission wires 14 beneath the arch. Since the transmission lines 14 are disposed within the confines of the arch, should any one of the lines 14 become separated from a connector 15, the separated line will remain within the confines of the tower 10 and will be prevented from swinging outwardly. Also, in order to support a grounded static wire 16, as is generally used in transmission towers for acting as a lightning protector for the current-carrying transmission wires 14, a steel saddle clamp 17 is mounted at about the center of the arch on the supports 12 in an upstanding manner.

The support rods 12 are made of a non-corrosive dielectric material, such as a glass fiber reinforced plastic, which is of sufficient strength to support the transmission wires 14 under conventional design loads. The spacer rods 13 are made of similar material as the support rods 12 and are secured to the support rods in an integral manner or in a detachable manner. When made integral with the support rods 12, the spacer rods 13 can either be bonded to the support rods by suitable adhesive materials upon erection of the tower support rods or the support rods and spacer rods can be bonded together to form a prefabricated tower which can be subsequently erected in place on the foundations 11.

In one embodiment, the support rods 12 are fabricated in a single tubular length from a plurality of resin impregnated glass fiber filaments which are laid longitudinally about a mandrel and subsequently cured, for example, as described in U.S. Patent 3,127,910. Alternatively, in order to increase the structural strength and stability of the rods, concentric layers of resin impregnated glass fiber filaments can be built up on the rod, for example, a spiral wound layer and a longitudinally laid layer as described in U.S. Patent 2,749,643. In another embodiment, the support rods 12 are formed as solid members from a plurality of resin impregnated glass fiber filaments. These solid members can be either of a constant cross section or of a tapering cross section along their length. Where tapered, the thinnest portion is contained at the apex of the tower while the thickest portions are contained at the ends. After the support rods are formed, each is cut to the appropriate length. Thereafter, the rods are placed in a suitable frame and bent into arch shapes which define the extents of the tower to be built. Next, the spacer rods which can be made in a similar manner as the support rods, are placed between pairs of adjacent support rods and bonded by suitable resins or otherwise secured at the ends to the support rods. At the same time, the apices of the rods are brought together and the rods are bonded or otherwise secured to each other along contiguous surfaces. Then, the frame is dismantled and the prefabricated transmission tower is removed.

In order to facilitate the mounting of the tower on a foundation support, suitable mounting plates or brackets can be integrally bonded to the respective ends of the support rods. Such mounting plates or brackets can then be secured to conventional bolt assemblies in the foundation support.

Alternatively, in another embodiment, instead of forming the support rods from a single length of rod, the support rods can be made from a number of interconnected rod sections. In this instance, the rod sections can be made of varying diameters such that the cross section of each support rod tapers from the base of the tower to the apex, the larger diameter being at the base.

Instead of making the towers in a prefabricated manner as described above, the tower can be erected in place in a similar manner after the support rods and spacer rods have been supplied to the erection site.

After the tower is erected, the insulator connectors 15 are mounted at appropriate points along the support rods in a suitable manner. The connectors can be mounted in a suspended maner or can be mounted to extend upwardly from the arch.

The invention thus provides an electrical transmission tower which is rigid, stable and strong. Also, the tower is mounted in a manner which allows the bases of the tower to be spaced at relatively large distances so that the tilting forces created by lateral forces on the tower about a base are more easily resisted. In addition, because the tower is formed as an arch with tapering widths, the tower more efficiently resists the forces imposed on the arch.

Further, since the tower is formed of non-corrosive dielectric materials, the tower is substantially maintenance free. Also, in the event that a transmission should separate from a connector, contact between the wire and the tower members will not create the difficulties presented where conductive metal towers have been used.

Additionally, because the material of the tower support rods and spacer rods is of glass fiber reinforced plastic construction, the tower is substantially non-tracking under most of the voltages associated with the transmission lines. This permits the elimination of a need for insulated connectors to mount the transmission lines. Further, where a non-tracking glass fiber reinforced plastic is used, the need for insulated connectors such as porcelain connectors is entirely eliminated.

What is claimed is:

1. An electrical transmission tower in the shape of an arch including at least three support rods defining said arch shape, said support rods being spaced apart at the bases of the arch and being secured to each other at the apex of the arch, said support rods converging towards each other from said base bases to said apex.

2. An electrical transmission tower as set forth in claim 1 further comprising a plurality of spacer rods secured to said support rods, each said spacer rod being secured to a pair of adjacent support rods.

3. An electrical transmission tower as set forth in claim 1 wherein said support rods are of a single continuous length along the axis of the arch.

4. An electrical transmission tower as set forth in claim 1 wherein said support rods comprise resin impregnated glass fiber filaments.

5. An electrical transmission tower as set forth in claim 1 wherein said support rods and said spacer rods are made of non-corrosive dielectric material.

6. An electrical transmission tower as set forth in claim 1 which further includes a plurality of insulated connectors mounted on said support rods for carrying electrical transmission lines.

7. An electrical transmission tower as set forth in claim 6 wherein said connectors are suspended downwardly from said support rods within the confines of the arch.

8. An electrical transmission tower comprising four support rods of non-corrosive dielectric material, each of said support rods being bent in the shape of an arch, said support rods being spaced from each other at the base of the arch and converging towards each other at the apex of the arch to define an arch which tapers in two perpendicular planes from said base to said apex; and a plurality of spacer rods of non-corrosive dielectric material, each of said spacer rods being secured to a pair of adjacent support rods to maintain the spacing of said support rods and to secure said support rods together.

9. An electrical transmission tower as set forth in claim 8 wherein said support rods and said spacer rods are made of resin impregnated fiber glass filaments.

References Cited

UNITED STATES PATENTS

| | | | |
|---|---|---|---|
| 241,179 | 5/1881 | Allison | 174—45 |
| 423,632 | 3/1890 | Rothenberg | 174—43 |
| 1,606,769 | 11/1926 | Miller | 52—86 |

FOREIGN PATENTS

| | | |
|---|---|---|
| 664,189 | 6/1963 | Canada. |
| 873,354 | 7/1961 | Great Britain. |

LARAMIE E. ASKIN, *Primary Examiner.*

U.S. Cl. X.R.

52—40, 86, 299